United States Patent Office 2,976,157
Patented Mar. 21, 1961

2,976,157

PRESERVATION OF COLOR OF CANNED GREEN VEGETABLES

George J. Malecki, Wellesley Hills, Mass., assignor to Patent Protection Corporation, New York, N.Y., a corporation of New York, as trustee No Drawing. Filed July 21, 1954, Ser. No. 444,923

1 Claim. (Cl. 99—186)

This invention relates to the preservation of the color of canned green vegetables. As is well known, green vegetables suffer a change in color during the canning process due to the increased acidity which results from the heat and pressure required for proper sterilization. Furthermore, the acidity continues to build up after the canning operation is completed, unless the cans are stored at sub-normal temperatures, and the color change continues so that after several months in storage the canned vegetables, particularly peas, are more yellow than green. On the other hand, peas and other green vegetables which are preserved by freezing retain their color without perceptible change for the year that they may be in storage from one packing season to the next, and although there is a substantial price difference in favor of the canned vegetables, the frozen green vegetables are enjoying an increasing popularity.

It is also known that the addition of sufficient alkali to the product to bring the pH of the brine, or liquid surrounding the sterilized canned product, to a point of 8 or slightly above lessens the color change during sterilization and subsequent storage in the can. The difficulty has been to select an alkali which in use does not constitute a health hazard to the consumer and which accomplishes the desired change in pH without appreciably affecting the desired flavor or texture of the product. A number of such processes have been proposed but to date none has come into general use.

It has also been proposed to add alkalis to the canning solution in such small amounts as to not significantly affect the flavor and texture of the vegetables to thereby reduce the color degradation which otherwise occurs during the canning process and to subsequently store the canned vegetables at temperatures below 50° F. to thereby retard the increase in acidity which occurs when the vegetables are stored at room temperature. Such processes also have not come into general use.

By my process the green color is retained without the addition of alkalis, and a room temperature storage of processed cans is possible with satisfactory color retention.

The color of green vegetables is due to the presence of chlorophyll. Chlorophyll contains magnesium and the increased acidity resulting from the canning process causes the chlorophyll to lose its magnesium with the formation of pheophytin which is yellow, thereby modifying the color of the vegetables to the extent that the reaction takes place.

In accordance with my invention I treat the peas or other vegetables, either before canning or during the canning process, in such manner as to modify the chlorophyll by the substitution of another non-toxic metal for the magnesium of the chlorophyll, the resulting substances being also green in color and stable under the conditions prevailing during the canning process and in the resulting medium whereby the vegetables will have and retain a green color similar to the color of the fresh vegetables, and with no adverse effect on the taste, texture, etc. of the canned product.

I have discovered that certain salts of aluminum or iron, if added in small quantities to the canning solution, will react with the chlorophyll in the peas or other green vegetables to form green compounds similar to chlorophyll but with the iron or aluminum substituted in whole or in part for the magnesium in the chlorophyll molecules. The chlorophyllins of these metals do not break down in the mildly acid media of the liquid contents of canned green vegetables processed in accordance with standard methods and consequently the green color will be retained without addition of alkalis and the like. Both iron and aluminum and their salts which are suitable for this process are completely non-toxic and are in fact found in many natural foods in amounts comparable to the amounts required for my improved process. Moreover, the substitution of the iron or aluminum for the magnesium in the chlorophyll molecule does not alter the taste of the peas or other green vegetables and the magnesium which is replaced by the iron or aluminum combines with the acids of the canning solution, forming salts which do not modify the taste or texture of the vegetables.

In carrying out my invention I preferably add to the canning solution, which is usually an aqueous solution containing 4.5 percent by weight of sucrose and 2.5 percent by weight of sodium chloride, 0.015 percent by weight of sodium aluminate. This solution is then added to the vegetables to be canned, the cans are filled with vegetables and solution and are thereafter sealed and sterilized in the conventional manner, generally by cooking at 240–260° F. from 7 to 35 minutes, depending on the temperature.

The ratio of solution to added vegetable varies with different vegetables and also to some extent with different canning practices. For peas the average ratio is 63 percent peas and 37 percent solution.

Sodium aluminate is quite alkaline and functions not only by the conversion of chlorophyll to an aluminum chlorophyllin but also by maintaining the pH of the canning solution at a higher value. Potassium aluminate in corresponding amounts may be used in lieu of the sodium aluminate. .04% by weight of ferrous phosphite may be substituted for the sodium aluminate in the above described process.

Ferrous phosphite and other ferrous compounds which react with the chlorophyll are reducing agents and thereby have an added effect in maintaining the color of the green vegetables. While it is not conclusively established that the atmospheric oxygen unavoidably present in the cans when packed by the conventional canning process promotes color change in the vegetables, experiments have indicated such to be the fact and also that the color change which occurs during room temperature storage is not so pronounced when a reducing agent is added to the canning solution.

The vitamin content of the food may be increased by the selection of appropriate compounds for reaction with the chlorophyll, for example, 0.05% of ferrous ascorbate, 0.2% of ferrous folate, 0.3% ferric folate, 0.07% ferrous para-amino benzoate or 0.1% ferric para-amino benzoate all give vitamin enrichment to the food.

Sodium glutamates are now used for flavor improvement and the substitution of glutamates of aluminum or iron, either ferrous or ferric, in whole or in part, for the sodium or other glutamates gives the same flavor improvement and also preserves the natural color of the green vegetables. The amount added should be in the order of 0.05 to 0.15%, depending on the particular salt used. Although the iron and aluminum glutamates are substantially insoluble in water they will partially solubilize in the canning solution by establishing a chemical equilibrium with the brine.

It will be understood that the particular compounds of iron and aluminum employed in the above examples are but representative of the type of compounds and that there are many other iron and aluminum compounds which will similarly react with the chlorophyll and which also do not significantly affect the taste, texture or food value of the product. The quantities required are also not critical but in the interest of economy and also of avoiding unnecessary additives to the food product the quantities of the salts added should be limited to approximately the amounts which under the conditions effect a conversion of such portion of the chlorophyll as required to maintain the desired color. The amounts specified in the several examples may be regarded as minimum amounts to obtain the desired results.

While a satisfactory retention of the green color in canned green vegetables may be obtained by the use of iron and aluminum compounds alone, I may with advantage use such compounds in conjunction with added alkalis or with buffer compounds, or with both, whenever these compounds are compatible with alkalis (e.g. do not give insoluble precipitates or decompose).

The following may be mentioned as additional compounds of aluminum and iron which may be substituted for the compounds specified in the foregoing examples, the amounts to be used to be determined on the basis of the metal in the particular compound available under the conditions prevailing during the canning operation for reaction with the chlorophyll.

The sequestrates of aluminum and iron such as polyphosphates, pyrophosphates, phytates, lactobiorates (oxidized lactose to acid), glucuronates, citrates and nucleates, are compatible with alkalis. Iron saccharate and iron and aluminum glycerophosphates are dietetic improvers. The protein hydrolyzates, peptonates, and proteinates of iron and aluminum are also flavor improvers. Iron and aluminum acetates, tartrates and sulphates are also suitable and are cheap and abundant.

As stated above, the primary objection to the use of alkali salts for the preservation of the green color in canned green vegetables is that if sufficient alkali is used to prevent color degradation for the duration of the average storage period, the color, taste and texture of the product are modified in such manner that the product is clearly distinguishable from the first quality canned products processed by the conventional procedure. By adding a small amount if appropriate iron or aluminum compound to the canning solution, a smaller amount of alkali is required to preserve the natural green color of the product.

It has been determined that the chlorophyll degradation begins at a pH of approximately 7 and to maintain this pH value in the cans through a year's period of storage at ordinary warehouse and store temperatures, the amount of alkali added to the cans must be such as to produce a pH in the product immediately after canning in the order of 8.0–8.5, and this amount of alkali gives to the product a "soapy" taste characteristic of such compounds and also impairs the texture of the vegetables. The various alkaline additives which have been used effect the vegetables differently, but when used in quantities to give a pH after canning of, say, 7.0–7.7, the adverse effect on taste and texture is not so pronounced, and although the ultimate acidity after a year's storage may reach a value of pH 6.75 the stabilizing effect of the aluminum or iron salts, even though added in small amounts, is such that the original green color of the vegetables will be substantially retained.

While I have mentioned merely iron and aluminum salts in the foregoing description, it will be understood that the equivalent non-toxic compounds of other metals may be employed. For instance, manganese compounds may be employed in equivalent quantities, and their use is particularly recommended in dietary packs, whenever the administration of manganese is recommended (e.g. anemia). The administration of manganese in the form of a food has obvious psychological advantages over administration in the form of a medicine (e.g. with children).

However, from the standpoint of cost and availability, iron and aluminum compounds are preferable. Instead of adding the metal compounds to the canning solution as above described the treatment of the green vegetables with these metal compounds to provide a replacement of the magnesium content of the chlorophyll may be accomplished by a pretreatment such as soaking the vegetables for a period of fifteen to twenty minutes in an aqueous solution of the selected compound. The treatment may also be accomplished by adding the compounds to the water in which the vegetables are blanched when that step is employed in the canning procedure.

It will be understood that instead of employing a single metal compound for reaction with the chlorophyll, two or more such compounds may advantageously be employed and that the procedure may be otherwise modified within the scope of the appended claim.

I claim:

The method of preserving color in canned green vegetables which consists in treating the green vegetables with sodium aluminate to effect an exchange of a substantial portion of the magnesium of the chlorophyll for the sodium of the sodium aluminate.

References Cited in the file of this patent

UNITED STATES PATENTS

| | | |
|---|---|---|
| 1,797,572 | Fulton et al. | Mar. 24, 1931 |
| 1,797,573 | Fulton et al. | Mar. 24, 1931 |
| 2,046,546 | Carter | July 7, 1936 |
| 2,046,547 | Carter | July 7, 1936 |
| 2,233,447 | Dolman | Mar. 4, 1941 |
| 2,473,747 | Gieseker | June 21, 1949 |